March 25, 1969     J. F. HORTON, JR     3,434,434

PALLET STRUCTURES AND METHODS FOR THEIR USE

Filed April 20, 1965     Sheet 1 of 4

INVENTOR.
John F. Horton Jr.
BY
Lane, Aitken, Dunner & Ziems

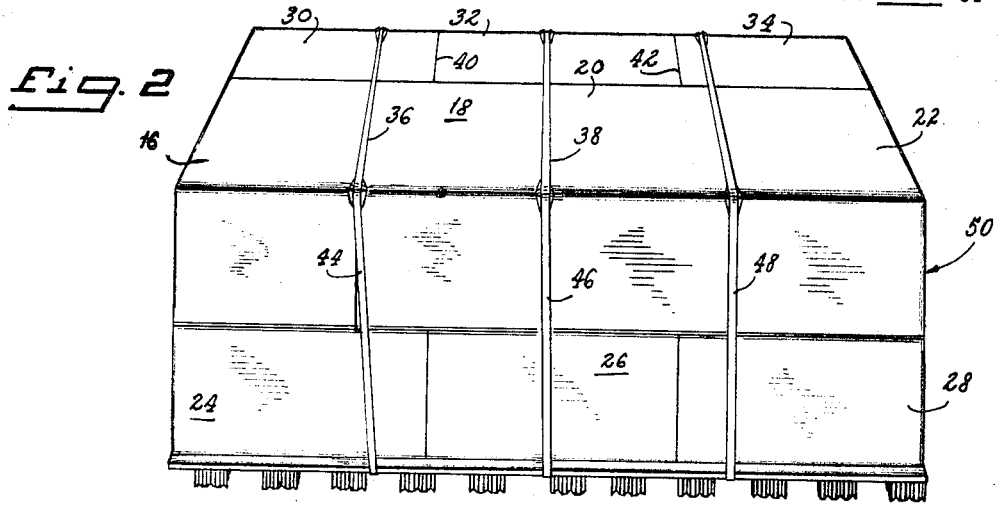
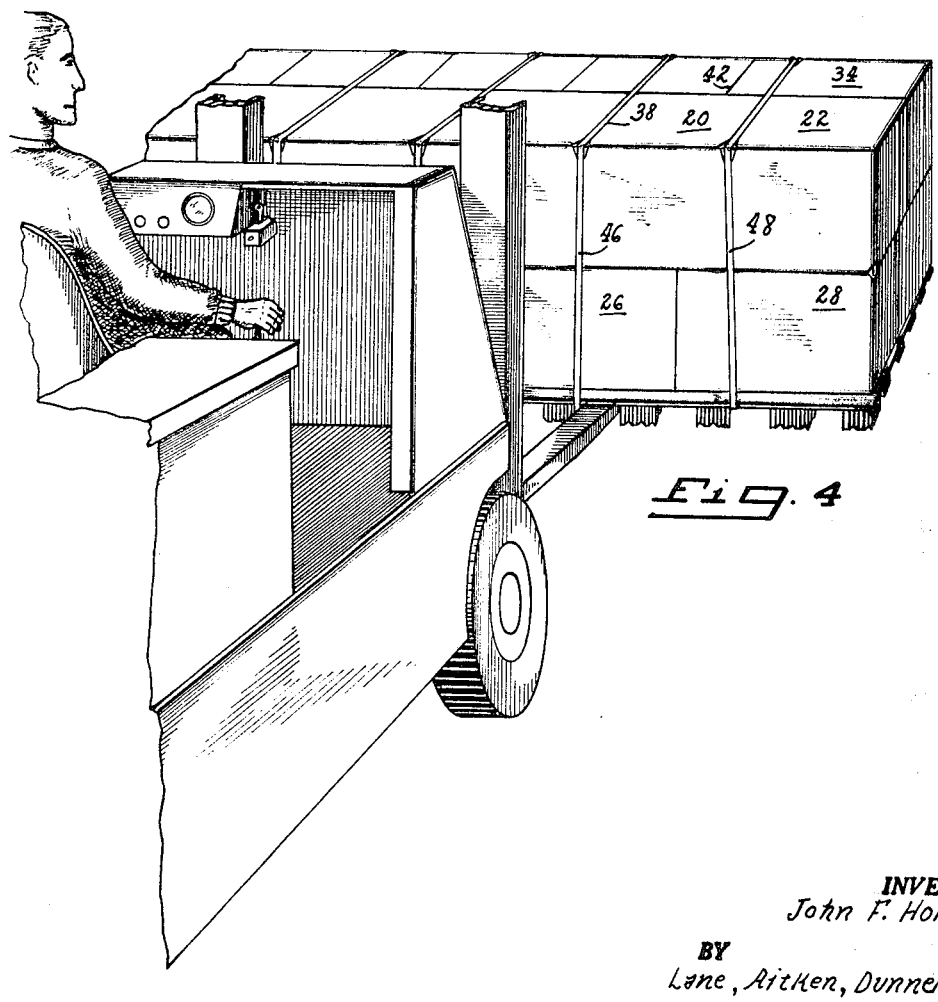

March 25, 1969  J. F. HORTON, JR  3,434,434
PALLET STRUCTURES AND METHODS FOR THEIR USE
Filed April 20, 1965  Sheet 4 of 4

INVENTOR
John F. Horton, Jr.

BY
Lane, Aitken, Dunner & Ziems
ATTORNEYS

United States Patent Office 3,434,434
Patented Mar. 25, 1969

3,434,434
PALLET STRUCTURES AND METHODS
FOR THEIR USE
John F. Horton, Jr., Babylon, N.Y., assignor to Cored
Panels, Inc., Farmingdale, N.Y., a corporation of New
York
Filed Apr. 20, 1965, Ser. No. 449,413
Int. Cl. B65d 19/22, 19/38
U.S. Cl. 108—51                                    18 Claims This invention relates to improved pallets of low-cost, lightweight and extreme versatility, to improved supports which are substitutes for pallets, and to methods for their use.

Fork trucks have long been considered to be important aids in the facilitation of the handling of heavy and bulky materials. The fork truck is conventionally used in conjunction with a pallet containing openings into which the tines of the fork truck extend and on which the materials to be transported or otherwise handled are supported.

Because of the significant loads which a given pallet is frequently called upon to support, conventionally constructed pallets are usually fabricated of materials having high strength and, necessarily, significant weight. Additionally, since a given pallet may be used to support loads varying significantly in their size, pallets in use today may not always be used in the most efficient manner.

In order to eliminate some of the problems of prior art pallets, a great variety of pallets have been developed in the past which solve one or more of the difficulties generally experienced in this field. For example, a great many patents have issued on pallet structures which are extremely light in weight and which are provided with collapsible supports, such for example as are disclosed in Cahners Patents 2,444,133 and 2,503,240 and Brown Patents 3,167,038 and 3,041,029, merely to mention a few. The pallets described in these patents, by virtue of their light weight and collapsibility, are adapted to minimize shipping costs to a significant extent. One difficulty with such pallets, however, is that such collapsible supports have significantly less load bearing capacity than is desirable in many of the demands currently met in this field and are not as inexpensive as is often desirable.

In accordance with the present invention, a novel pallet has now been conceived which eliminates many of the problems attendant the use of conventional pallets without concurrent loss of their advantages and which is extremely low in cost, extremely light in weight, of great structural strength and which has great versatility. The present invention also involves novel palletizing members providing similar advantages, as well as novel composite structures from which such palletizing members may be made.

It is accordingly an important object of the present invention to provide a novel pallet for use in connection with fork trucks and the like which is inexpensive to fabricate, is extremely light in weight, has great structural strength and has great versatility.

It is another important object of the present invention to provide an improved pallet comprised of a sheet of material secured to one side of which is a plurality of cellular supports which are sufficiently spaced from one another to permit the use of the pallet in conjunction with a fork truck.

It is another object of the present invention to provide an improved pallet comprising a sheet and a plurality of supports secured to one side of the sheet, the sheet containing at least one line of weakness along which the sheet can be parted to form a plurality of smaller pallets which may be used more efficiently to support smaller sized loads.

It is another important object of the present invention to provide a novel pallet comprising a sheet and a plurality of supports secured to one side of the sheet, the other side of the sheet containing a coating of adhesive (preferably pressure-sensitive) by means of which the pallet may be bonded to the underside of a load to be supported by the pallet.

It is a further important object of the present invention to provide novel adhesively coated cellular palletizing members or supports which can be used in conjunction with a payload to eliminate the necessity for a conventional pallet, as well as to methods for the use of such members.

It is still another important object of the present invention to provide a novel composite cellular structure to which are imparted lines of weakness to permit and facilitate the subdivision of said structure into individual palletizing members of any desired size.

These and other important objects and advantages of the present invention will become more apparent upon reference to the ensuing description and appended claims, and drawings wherein:

FIGURE 4 illustrates a fork truck supporting a payload such as that shown in FIGURE 2;

FIGURE 5 illustrates a container supported on the novel pallet of the present invention, the container being adhesively secured to the upper surface of said pallet by means of a coating of adhesive on the upper surface of the pallet;

Figure 1:
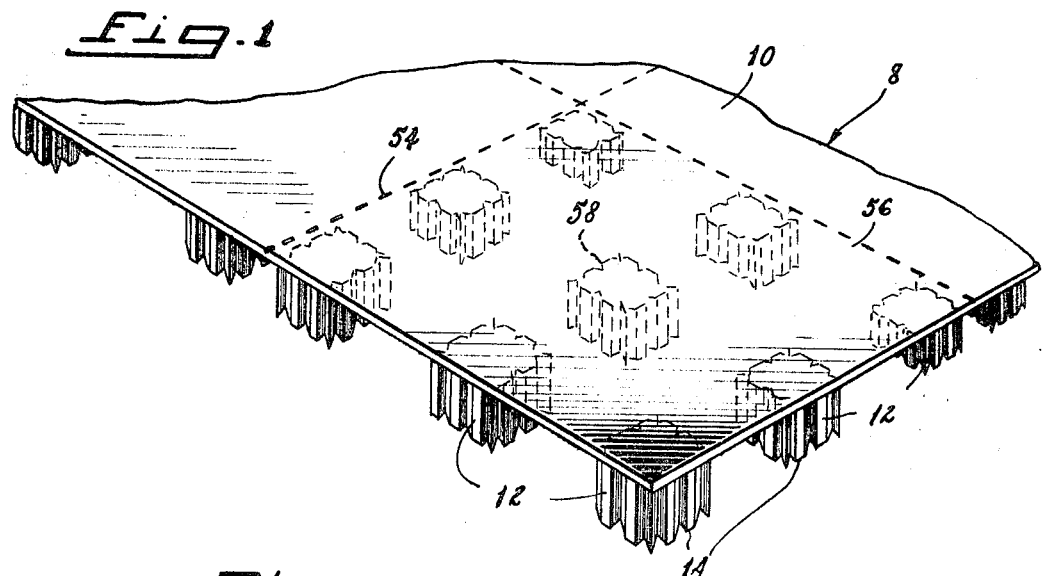
FIGURE 1 represents an isometric view, partly broken away, of the novel pallet of the present invention.

The novel pallet of the present invention, a preferred form of which is illustrated in FIGURE 1, is indicated generally at 8 and is comprised of a sheet of facing material 10 to one face of which are secured a plurality of cellular supports 12, the ends 14 of the supports 12 which are remote from sheet 10 being free.

In order to achieve the maximum advantage from the novel pallets of the present invention, the cellular supports 12 should each be formed of sheet material whose length to thickness ratio and cell configuration and size are such that said support would fail in crushing rather than in buckling when subjected to a load coaxial with the cell walls of the support. Excellent results are obtained using a honeycomb material having uniform hexagonal cells, with the walls of the honyecomb being normal to the plane of sheet 10 to provide the pallet with the maximum strength in compression. Such honeycomb supports are advantageously made of kraft paper. The desirable advantages of the novel pallets of the present invention are also obtained with a support formed of a plurality of sheets of corrugated paperboard laminated together to form what is known as "multiple corrugated paperboard," an example of such material being that sold under the designation "Verticel" by the Verticel Company of Pittsburgh, Pa. Such a support would, of course, be affixed to sheet 10 with its flutes normal to the plane of the sheet.

The facing sheet 10 may be fabricated of any suitable material dictated by the specific purpose for which the pallet is to be used, heavy corrugated cardboard or composition board being quite suitable for conventional purposes.

Supports 12 are suitably spaced from one another on the face of the sheet 10 to which they are attached to provide the necessary support to the sheet and the load which it is adapted to carry while permitting the introduction between them of the tines of a fork truck so that the pallet and its payload may be suitably transported from one point to another. Preferably, the supports 12 should be positioned with respect to one another so that straps used to secure a payload to the pallet may be wrapped about the payload-pallet combination without interference from the supports (as seen in FIGURES 2 and 4).

Figure 2:
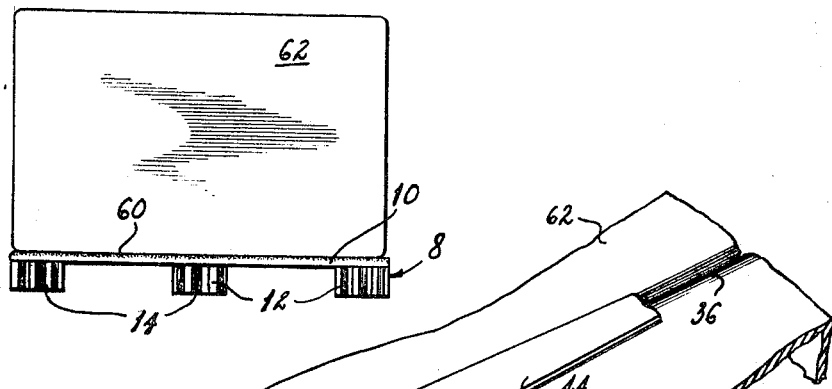
FIGURE 2 illustrates a plurality of containers strapped to and supported by the novel pallet of the present invention.
Figure 3:
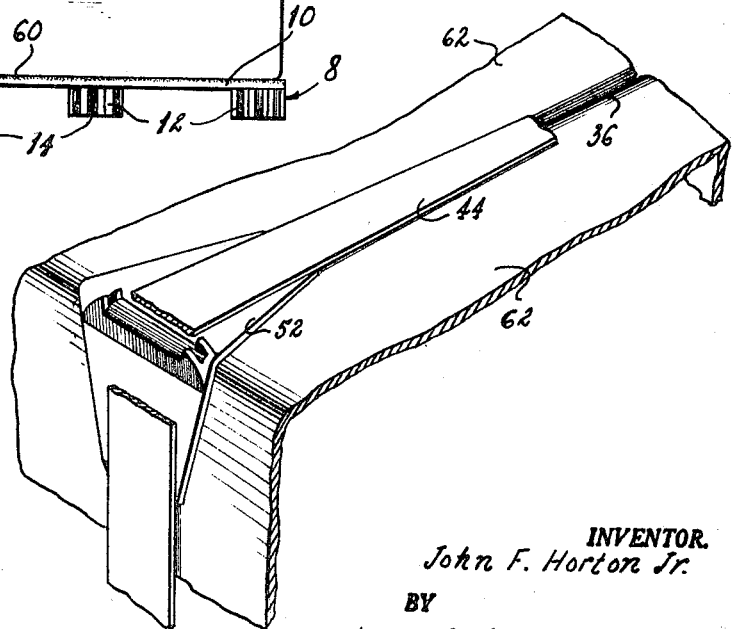
FIGURE 3 is a partly broken away detailed perspective view of several containers adapted to be supported by the pallet of the present invention illustrating the manner of securing said containers together and to said pallet.

The specific manner of mounting a payload involving a plurality of packages on the pallet of the present invention is illustrated in FIGURES 2, 3 and 4. As best shown in FIGURE 2, several containers 16, 18, 20, 22, etc. are arranged in staggered relationship with respect to adjacent containers 24, 26, 28, 30, 32, 34, etc., in the manner in which a plurality of brick used to form a wall are arranged, so that the junctures 36, 38, etc. of one row of adjacent containers will be offset from the junctures 40, 42, etc. of the next adjacent row of containers, so as to permit the straps 44, 46 and 48 to provide the overall payload 50 with the maximum stability and strength so that the payload will not separate while being transported from one point to another.

As shown in FIGURE 3, the corners of adjacent containers in the payload which are traversed by any of the straps 44, 46 or 48 are provided with corner supports or cushions 52 which prevent the straps from eating their way into the containers and which also serve, when placed at the juncture (such as juncture 36 in FIGURE 3) of two containers, to distribute the strap load over two containers rather than one.

The simplicity in construction of the pallet of the present invention makes possible the improvement in pallet structure which is specifically illustrated in FIGURE 1. As shown therein, the pallet is provided with at least one line of weakness 54 (shown in FIGURE 1 as being a perforation in facing sheet 10) to facilitate the subdivision of the pallet into a plurality of pallets bounded by the lines of weakness and each having its own supports 12. As will be readily apparent to those skilled in the art, this feature permits a pallet of a given size to be sufficiently subdivided (depending upon the positioning of the lines of weakness which are provided in the pallet) so that it may be used with maximum efficiency for a given payload.

So that each subdivided pallet may be used in conjunction with a conventional fork truck, the original pallet containing the lines of weakness should be provided with sufficient supports 12 so that, after division of the pallet into its component subdivisions, each subdivision will have supports sufficiently spaced from one another to permit entry between them of the tines of a fork truck while still providing ample support for the pallet. This result may be accomplished under ordinary circumstances by providing the facing sheet 10 with a sufficient number of supports 12 so that the subdivided unit will have three supports 12 along each of the subdivision edges, as may be seen more particularly by the dotted lines set forth in one of the sub divisions 56 in FIGURE 1, with an added support 58 being provided in the center of the subdivision to provide desired support. Such an arrangement not only permits the entry between the supports of the tines of a fork truck but permits the pallet, whether in whole or subdivided form, to be secured to its payload by means of a plurality of straps without interfering with the positioning of such straps. Another feature of this arrangement is that it effectively provides a 4-way type pallet, making it possible to lift the pallet with a fork truck from any side. This feature is also provided with the pallet prior to its subdivision if the supports are suitably positioned.

Still another important feature of the present invention is illustrated in FIGURE 5. When a single container is to constitute the payload, the handling problem can be simplified by obviating the necessity for straps such as were required in a payload of the type illustrated in FIGURES 2 and 4 by providing the upper surface of the facing sheet 10 with a coating of adhesive 60. The adhesive 60 will make possible the securing of the container 62 in a more or less permanent fashion to the pallet 8 so that no strap or other fastening means will be required to secure the payload to the pallet. When the pallet thus secured to the payload has served its function, the pallet may be disposed of with the container to which it is secured.

Best results are obtained in this embodiment of the present invention by using a pressure sensitive adhesive to form the adhesive coating 60 on the facing sheet 10, though other adhesives (i.e., those which are moisture-sensitive) may be employed if desired.

Figure 6:
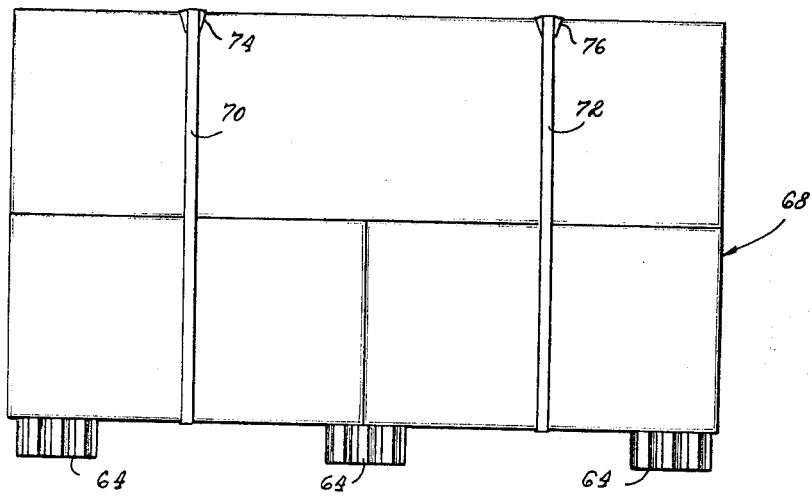
FIGURE 6 is a side elevation illustrating a plurality of containers secured together by means of fastening straps and supported by a plurality of supports which serve as a substitute for the conventional pallet.
Figure 7:
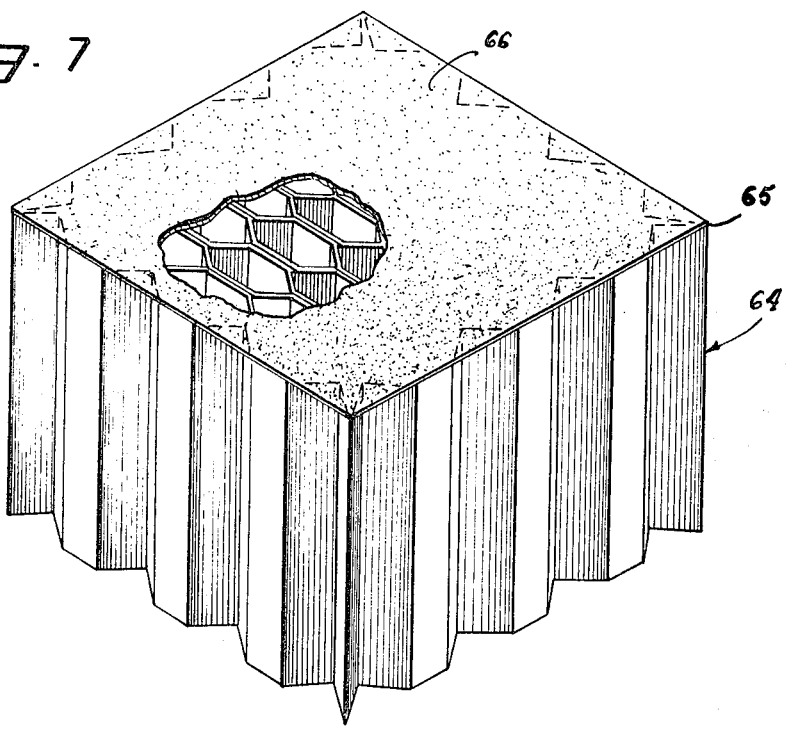
FIGURE 7 illustrates an isometric view of a novel support such as is used in the payload of FIGURE 6.

Another embodiment of the present invention is illustrated in FIGURES 6 and 7. In this embodiment, a plurality of cellular supports or palletizing members 64, each having a facing sheet 65 on one of its ends and an adhesive coating 66 on the exposed surface of the facing sheet, are directly secured to the underside of a payload 68 without the intermediary of a facing sheet of the type comprising the facing sheet 10 illustrated in the embodiments of FIGURES 1–5. (The main purpose of the facing sheet 65, which may be formed of a thin strip of paper, is to provide a surface for the application of adhesive and, as well, to distribute the load over the entire support rather than to concentrate it at the cell wall edges which are in contact with the load.) As was the case in connection with the pallets of FIGURES 1–5, the supports 64 are spaced on the underside of payload 68 to provide necessary support while leaving sufficient space between them to permit entry of the tines of a fork truck to permit removal of the payload from one point to another. Supports 64, as shown in FIGURES 6 and 7, are preferably of honeycomb or other cellular construction meeting the requirements previously enumerated.

Individual adhesively coated supports such as are shown in FIGURES 6 and 7 may effectively be used either in the case of a single object to be supported by a fork truck or in connection with a plurality of such objects of a size and quantity such that they can be suitably secured together as a unit without the necessity for a supporting surface beneath them such as is provided by the facing sheet 10 of the embodiment of FIGURES 1–5. In the case of a plurality of objects, the desired stability in the payload may be provided by arranging the objects in staggered relation (as shown in FIGURE 6) so that the juncture of any two of the objects does not coincide with the juncture of any of the others of said objects, with straps (such as straps 70 and 72 in FIGURE 6) being wrapped about the assembled objects, as was the case in connection with the payload of FIGURES 2 and 4. As was the case in connection with the payload of FIGURES 2 and 4, corner supports or cushions 74 and 76 are positioned beneath straps 70 and 72 at the corners of the payload at the junctures of the objects contained therein.

As will be apparent to those skilled in the art, the use of individual supports such as are shown in FIGURES 6 and 7 is most desirable when the objects in any given payload are packaged so that the package can be disposed of when it has served its function, along with the supports which are adhesively secured to them. The low cost of such supports makes its practicable to use them in such a disposable manner.

Figure 8:
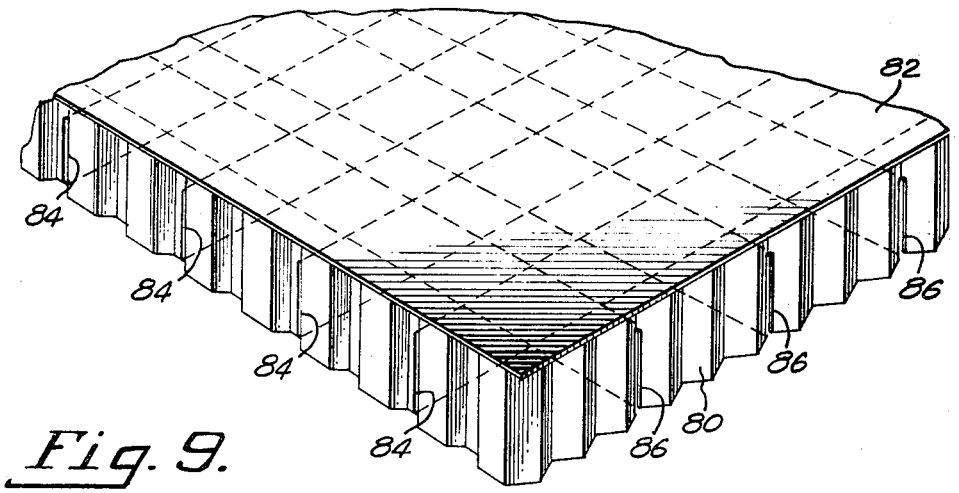
FIGURE 8 is an isometric view, partly broken away, of a novel composite cellular structure adapted to be subdivided into individual palletizing members.
Figure 9:
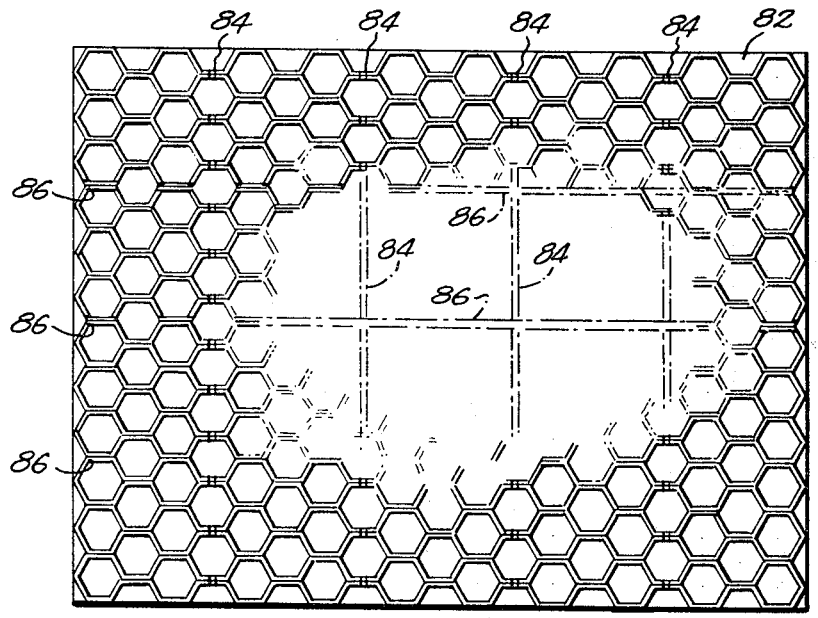
FIGURE 9 is a bottom plan view of the structure of FIGURE 8.

A further important feature of the present invention is illustrated in FIGURES 8 and 9. These figures respectively illustrate a partly broken away isometric view and bottom plan view of a composite cellular structure which is particularly well-adapted for the fabrication of the palletizing members illustrated in FIGURES 6 and 7. This composite cellular structure is comprised of a continuous body of a cellular support 80 having a skin or facing sheet 82 bonded to one of its faces. This skin 82 is analogous to the facing sheet 65 used in connection with the cellular support 64 of FIGURE 7 in that it may be formed of a thin strip of paper to provide a surface for the application of adhesive, as distinguished from thicker facing sheets such as that identified by the numeral 10 in FIGURE 1, which has a structural function in the pallet structure described in connection with that figure.

The cellular body 80 (which is the same cellular structure described previously in connection with the foregoing embodiments of the present invention) is provided with a plurality of spaced, transversely extending slits 84 and a plurality of longitudinally extending slits 86 which, as is clearly shown in FIGURES 8 and 9, extend upwardly toward facing sheet 82 through a substantial portion of the depth of cellular body 80 but terminate short of facing sheet 82. The purpose of these slits is to subdivide the structure of FIGURES 8 and 9 into a plurality of smaller cellular units which may be used as the palletizing members of FIGURES 6 and 7.

The advantage of a structure such as that shown in FIGURES 8 and 9 is that it permits the formation of a palletizing member or support of any desired dimension (limited only by the total extent of the composite structure) depending upon the particular needs of a given palletizing operation. Thus, if an extremely heavy object is to be palletized, the composite structure of FIGURES 8 and 9 can be broken down into subunits, each embracing six (or nine, or any other number) of the squares illustrated in FIGURES 8 and 9. Alternatively, the composite structure of this embodiment can equally well be utilized for the formation of individual palletizing supports formed of only one of such squares. The particular choice of the size of palletizing unit to be subdivided away from the composite structure of FIGURES 8 and 9 will, of course, depend on many factors, included in which are the size of the cells of the cellular core 80, the weight of the paper or other material used to form such cells, the degree of impregnation of said paper with stiffening materials (assuming there is such impregnation), the size of the subunits of the composite structure and the size and weight of the item being palletized.

The slits 82 and 84 are provided as lines of weakness to facilitate the subdivision of the composite structure of FIGURES 8 and 9 into any desired size of palletizing member. As will be seen particularly in FIGURE 8, however, the slits terminate short of the facing sheet 82 so that the composite structure can be substantially self-supporting in its nonsubdivided form.

Slits such as those indicated by the numerals 82 and 84 in FIGURES 8 and 9 may be readily imparted to the composite structure shown therein. For example, the longitudinal slits 86 may be made by the longitudinal slitters ordinarily provided in paper-facing machines. The transverse slits 84 may equally conveniently be made by a conventional end cut-off machine.

The facing sheet 82 of the composite structure of FIGURES 8 and 9 can be coated with an adhesive material (preferably pressure-sensitive), as was the corresponding facing sheet 65 in the embodiment of FIGURES 6 and 7, to facilitate the securing of individual palletizing members to a payload.

The structures of the present invention provide many significant advantages over analogous prior art pallet structures, including but not restricted to those specifically identified at the beginning of this specification. For example, the cellular supports used in connection with the present invention possess a much greater load-bearing capacity than the supports used in the identified prior art patents. At the same time, they are extremely inexpensive to fabricate and make possible a significant lowering in cost of the pallet structure.

The significant load-bearing capacity provided by the cellular supports of the present invention is indeed one of the important features of this application since one skilled in the art would not expect that unfaced cellular material such as the honeycomb described as a preferred embodiment in the present application would, when used in the manner described herein, have a load-bearing capacity of the magnitude actually possessed by them. This makes possible the use of supports fabricated from kraft paper or the like having extremely high load-bearing capacity, making the pallets and pallet substitutes of the present invention usable under a wide range of load conditions.

The composite structure of FIGURES 8 and 9 is particularly advantageous in that it provides great flexibility of action at the site of the palletizing operation since the operator can decide at the last minute the size of the palletizing members needed to provide the required support for the payload in question. In addition, the very nature of this composite structure is such that individual palletizing supports can be purchased in great quantity with shipping costs reduced to an absolute minimum since the cost of the basic platform support ordinarily included in conventional pallets is eliminated.

The invention may be embodied in other specific forms without departing from the spirit or essential characteristics thereof. The present embodiments are therefore to be considered in all respects as illustrative and not restrictive.

What is claimed is:

1. A pallet comprising a sheet of material; a plurality of cellular supports secured to one face of said sheet; the axis of greatest strength in compression of said supports being substantially normal to the plane of said sheet; each of said cellular supports being formed of sheet material whose length to thickness ratio and cell configuration and size are such that said support would fail in crushing rather than in buckling when subjected to a load coaxial with the cell walls of said support; said cellular supports being sufficiently spaced from one another to permit entry therebetween of the tines of a fork truck.

2. A pallet as defined in claim 1 wherein said cellular supports are fabricated from kraft paper.

3. A pallet as defined in claim 1 wherein the side of said sheet material opposite that to which said supports are secured is coated with an adhesive.

4. A pallet as defined in claim 1 wherein said sheet contains at least one line of weakness to facilitate its subdivision into a plurality of sheets each having cellular supports secured to one face thereof, said cellular supports being positioned so that, after the subdivision of said sheet along said line of weakness, each of the subdivided sheets has cellular supports sufficiently spaced from one another to permit entry therebetween of the tines of a fork truck, each of said plurality of sheets defined by said line of weakness having at least three supports positioned in nonlinear relationship so as to provide an independent and stable support system for each of said plurality of sheets.

5. A pallet as defined in claim 4 wherein the side of said sheet material opposite that to which said supports are secured is coated with a pressure-sensitive adhesive.

6. A pallet as defined in claim 1 wherein said cellular supports are honecomb in cross section, the walls of the honeycomb being normal to the plane of said sheet.

7. A pallet comprising a sheet of material; a plurality of cellular supports each of which is secured at one of its ends to one face of said sheet, the other end of each of said supports being free; the axis of greatest strength in compression of said supports being substantially normal to the plane of said sheet; each of said cellular supports being formed of sheet material whose length to thickness ratio and cell configuration and size are such that said support would fail in crushing rather than in buckling when subjected to a load coaxial with the cell walls of said support, said cellular supports being sufficiently spaced from one another to permit entry therebetween of the tines of a fork truck.

8. A pallet comprising a sheet of material; a plurality of supports each secured at one of its ends to said sheet of material and being free at its other end; said supports being sufficiently spaced from one another to permit entry therebetween of the tines of a fork truck; said sheet containing at least one line of weakness to facilitate its subdivision into a plurality of sheets each having supports secured to one face thereof; said supports being positioned so that, after the subdivision of said sheet along said line of weakness, each of the subdivided sheets has supports sufficiently spaced from one another to permit entry therebetween of the tines of a fork truck.

9. A cellular support for use in connection with a load to be lifted by a fork truck; said cellular support being formed of sheet material whose length to thickness ratio and cell configuration and size are such that said support would fail in crushing rather than in buckling when subjected to a load coaxial with the cell walls of said support, said cellular support having a coating of an adhesive material on one of its end faces; the end face on which said adhesive material is coated being substantially normal to the axis of greatest strength in compression of said support.

10. A cellular support as defined in claim 9 wherein said one end face has a sheet of material bonded to it the plane of which is normal to the walls of said cellular support; said adhesive material being on the exposed face of said bonded sheet of material.

11. A cellular support as defined in claim 9 wherein said cellular support is of a honeycomb configuration and said coating of adhesive is along a plane substantially normal to the walls of said honeycomb.

12. A method of preparing a payload for use in conjunction with a fork truck, said payload being comprised of at least one object to be lifted by said fork truck, comprising: securing directly to the underside of said payload a plurality of separated cellular supports each having a coating of adhesive material on one of its end faces with said adhesive material being in contact with said underside; the end face on which said adhesive material is coated being substantially normal to the axis of greatest strength in compression of said support; each of said cellular supports being formed of sheet material whose length to thickness ratio and cell configuration and size are such that said support would fail in crushing rather than in buckling when subjected to a load coaxial with the cell walls of said support, said supports being sufficiently spaced from one another to permit the entry between them of the tines of said fork truck.

13. A method of preparing a payload for use in conjunction with a fork truck, said payload being comprised of an object to be lifted by said fork truck, comprising: adhesively securing to the underside of said object a pallet comprised of a sheet of material having a plurality of cellular supports each secured at one of its ends to said sheet of material and being free at its other end; said supports being sufficiently spaced from one another to permit entry therebetween of the tines of a fork truck; each of said cellular supports being formed of sheet material whose length to thickness ratio and cell configuration and size are such that said support would fail in crushing rather than in buckling when subjected to a load coaxial with the cell walls of said support; said sheet of material having an adhesive coating on its side opposite that to which said supports are secured; said adhesive coating being employed to adhesively secure said pallet to the underside of said object as above-described.

14. A composite structure for use in connection with loads to be lifted by a fork truck comprising: a slab-shaped cellular body the cells of which extend substantially completely throughout its extent; said body being formed of sheet material whose length to thickness ratio and cell configuration and size are such that said support would fail in crushing rather than in buckling when subjected to a load coaxial with the cell walls of said body; said cellular body containing at least one line of weakness to facilitate its subdivision along a plane parallel to said cell walls into a plurality of cellular bodies.

15. A structure as defined in claim 14 wherein said line of weakness is provided in the form of a slit in said cellular body along a plane parallel to said cell walls.

16. A structure as defined in claim 15 wherein one face of said cellular body is bonded to a sheet of material and said slit terminates short of said sheet of material but extends more than halfway through said cellular body.

17. A structure as defined in claim 14 wherein one face of said cellular body is bonded to a sheet of material; said sheet of material having a coating of adhesive on the side of said sheet not in contact with said cellular body.

18. A composite structure for use in connection with loads to be lifted by a fork truck comprising: a slab-shaped cellular body the cells of which extend substantially completely throughout its extent; said body being formed of sheet material whose length to thickness ratio and cell configuration and size are such that said support would fail in crushing rather than in buckling when subjected to a load coaxial with the cell walls of said body; one face of said cellular body being bonded to a sheet of material whose plane is transverse to that of the cell walls of said body; a plurality of spaced slits in said cellular body, said slits extending in a first direction; a plurality of spaced slits in said cellular body extending in a second direction and intersecting said first-mentioned slits; said slits creating lines of weakness in said cellular body which facilitate the subdivision of said body into a plurality of smaller bodies.

References Cited

UNITED STATES PATENTS

| | | | |
|---|---|---|---|
| 2,519,839 | 8/1950 | Leisen | 108—58 |
| 3,187,689 | 6/1965 | Hess | 108—58 |
| 3,187,691 | 6/1965 | Leitzel | 108—58 |
| 3,013,922 | 12/1961 | Fisher | 264—45 |
| 3,152,199 | 10/1964 | Roberts | 264—45 |
| 3,177,271 | 4/1965 | Slayman | 264—45 |
| 3,124,627 | 3/1964 | Hood | 264—54 |
| 2,583,443 | 1/1952 | Perry et al. | 108—57 |
| 2,673,052 | 3/1954 | Risch. | |
| 3,055,624 | 9/1962 | Wilson | 108—58 |
| 3,104,085 | 9/1963 | Skladany | 108—51 X |

FOREIGN PATENTS 601,456    7/1960    Canada.

BOBBY R. GAY, *Primary Examiner.*

G. O. FINCH, *Assistant Examiner.*

U.S. Cl. X.R.

108—58; 264—45; 214—152